Figure 1:
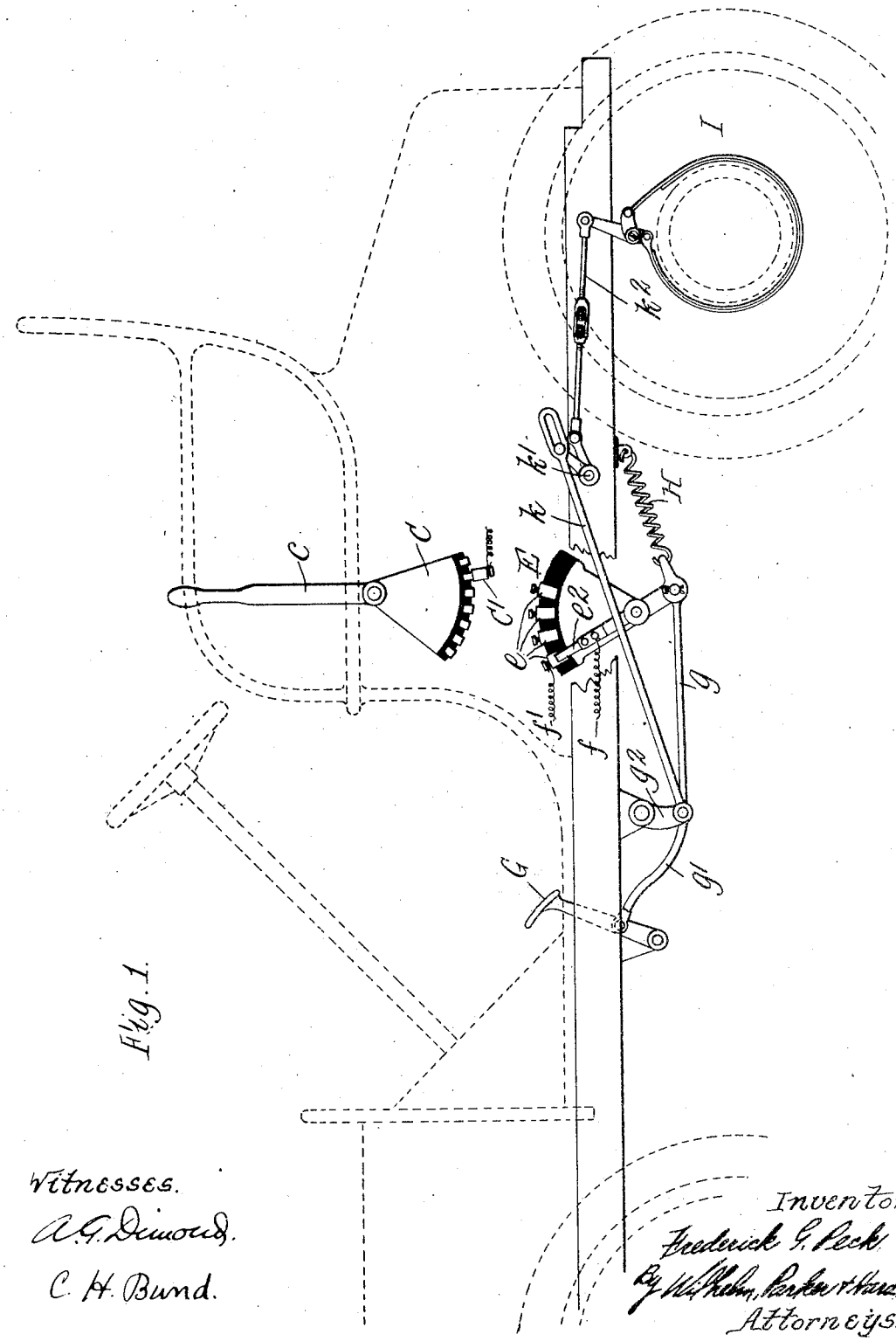

F. G. PECK.
CONTROLLING MECHANISM FOR ELECTRICAL VEHICLES.
APPLICATION FILED OCT. 16, 1909.

1,097,358.

Patented May 19, 1914.

Witnesses.
A. G. Dimond.
C. H. Bund.

Inventor.
Frederick G. Peck
By Wilhelm, Parker & Hurd
Attorneys.

F. G. PECK.
CONTROLLING MECHANISM FOR ELECTRICAL VEHICLES.
APPLICATION FILED OCT. 16, 1909.

1,097,358.

Patented May 19, 1914.

Witnesses.
A. G. Dimond.
C. H. Bund

Inventor.
Frederick G. Peck,
By Wilhelm, Parker & Hard,
Attorneys.

UNITED STATES PATENT OFFICE.

FREDERICK G. PECK, OF BUFFALO, NEW YORK, ASSIGNOR, BY MESNE ASSIGNMENTS, TO BUFFALO ELECTRIC VEHICLE COMPANY, OF BUFFALO, NEW YORK.

CONTROLLING MECHANISM FOR ELECTRICAL VEHICLES.

1,097,358.  Specification of Letters Patent.  Patented May 19, 1914.

Application filed October 16, 1909. Serial No. 522,939.

*To all whom it may concern:*

Be it known that I, FREDERICK G. PECK, a subject of the King of Great Britain, residing at Buffalo, in the county of Erie and State of New York, have invented a new and useful Improvement in Controlling Mechanisms for Electrical Vehicles, of which the following is a specification.

This invention relates more particularly to improvements in controlling means for use on electrically propelled vehicles in which storage batteries are employed as the source of motive power.

The primary objects of the invention are to simplify the handling of such vehicles, and to provide a controlling mechanism whereby the vehicle motor can be operated at different predetermined rates of speed and whereby the speed of the vehicle can be regulated to some extent or the power shut off and the brakes applied to stop the vehicle at any time by the operation of a single lever, preferably a foot lever.

The controlling mechanism comprises a controller by means of which the battery cells and the field coils of the motor can be connected in different combinations to cause the motor to operate at different rates of speed, and in addition thereto a control switch by means of which the resistance of the motor circuit can be changed at any time irrespective of the speed for which the controller is set, to thus regulate more or less the speed of the vehicle, or the circuit can be opened to shut off the power. The controller may be operated by a handle or lever located in any convenient position, for instance, at the side of the driver's seat. The control switch is preferably operated by a spring-actuated foot lever which normally holds the switch in the position in which all resistance is cut out of the circuit, and which returns the switch to this position when the operator takes his foot off of the lever. As the foot lever is depressed, resistance is gradually brought into the circuit until finally the circuit is opened and the current shut off. To start the vehicle or change from one speed to a higher speed, the operator shoves the foot lever to the open circuit position, sets the controller for the proper speed, and then allows the foot lever to return slowly and gradually cut out the resistance. The foot lever is also connected to the brakes in such manner that the brakes are applied by depressing the foot lever beyond the open circuit position, so that to shut off the current and apply the brakes for stopping the vehicle it is only necessary to fully depress the foot lever.

Figure 2:
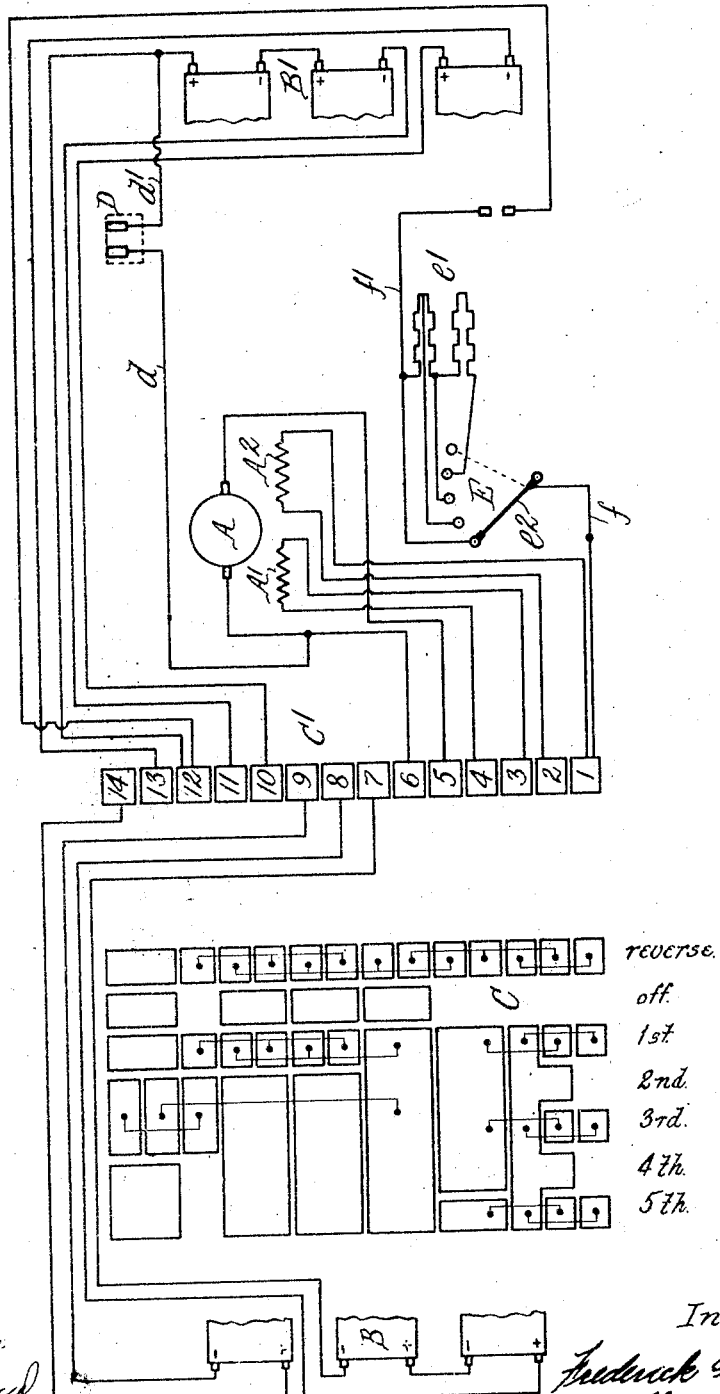

In the accompanying drawings, consisting of three sheets: Figure 1 is a side elevation of a controlling mechanism embodying the invention. Fig. 2 is a diagram of the electrical connections. Figs. 3, 4, 5, 6, 7 and 8 are diagrams illustrating the different battery and field combinations for the several forward and reverse speeds secured by the different adjustments of the controller.

Like reference characters refer to like parts in the several figures.

A, Fig. 2, represents the armature and $A'$ $A^2$ the field windings of the vehicle motor, and B and $B'$ the cells of the storage battery which are arranged, as usual, in the front and rear portions of the vehicle.

C and $C'$ represent respectively the movable and stationary members of the controller by which the necessary electrical connections are established for causing the motor to run at different rates of speed. This controller may be of any usual or suitable construction and it may be located under the driver's seat and operated by a handle $c$ at one side of the seat, as shown, or otherwise, as desired. The operation of controllers of this sort is well known and it is sufficient for the purpose of this invention to briefly describe the operation as follows: The stationary member $C'$ of this controller is provided with a series of contacts numbered 1–14 in Fig. 2, and the movable member or drum C is provided with coöperating contacts arranged thereon in rows which are designated respectively "Off", "1st", "2nd", "3rd", "4th", "5th", and "Reverse", see Fig. 2. When the controller drum is in the charging or stand-still position the contacts in the row designated "Off" coöperate with the stationary contacts 6–11, 13 and 14 and the motor is disconnected from the battery and all of the cells are connected in series to the leads $d$ $d'$ from the charging block D, where the terminals from the generator or source of supply are attached for charging the battery.

Figure 3:
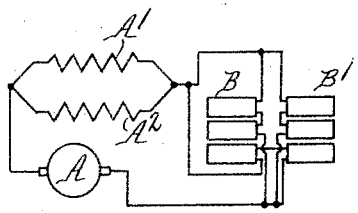

When the controller drum is swung to the first speed position, the drum contacts in the row designated "1st" coöperate with the stationary contacts to establish connections as shown in the diagram, Fig. 3. The cells of the battery are then connected in three groups, which groups are connected in multiple or parallel, and the motor fields are also connected in multiple. By this arrangement one third of the maximum battery voltage is obtained and the motor runs at its slowest speed.

Figure 4:
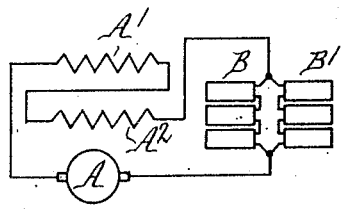

By throwing the controller drum to the second speed position, the drum contacts in the row marked "2nd" coöperate with the stationary contact and the cells are then connected in two groups and the fields are connected in series, as shown in the diagram, Fig. 4. Thus one-half of the maximum battery voltage is obtained, but as the fields are connected in series, a lower speed is produced with the same voltage than if the fields were connected in parallel.

Figure 5:
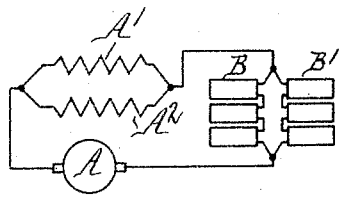

In the third speed position, in which the drum contacts in the "3rd" row coöperate with the stationary contacts, the connections which are shown in the diagram, Fig. 5, differ from those in the second speed position only by having the fields connected in multiple instead of in series. The speed will consequently be somewhat greater than the second speed.

Figure 6:
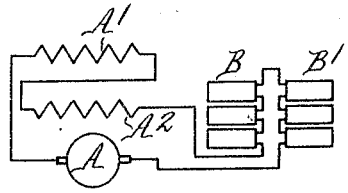

By throwing the controller over to the "4th" speed position, the connections are made as shown in the diagram, Fig. 6. The cells are then all in series so as to give the maximum battery voltage. The fields are again connected in series so that the maximum speed is not yet attained.

Figure 7:
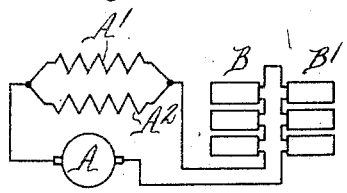
Figure 8:
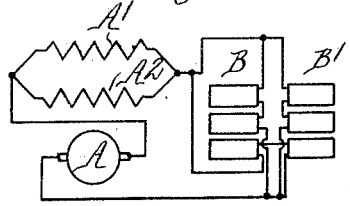

At the "5th" speed position the connections are as shown in the diagram, Fig. 7. All of the cells are connected in series and the fields in multiple, and the maximum speed is obtained.

By turning the controller drum in the opposite direction from the "off" or charging position to the "reverse" position, contacts are made to connect the motor for reversing. The connections for reverse are the same as those for the "1st" speed ahead except that the armature terminal connections are reversed, as shown in the diagram, Fig. 8.

E represents the control switch, which has a series of contacts $e$ connected to resistance means $e'$ and a contact arm $e^2$ which is movable from one to the other of said contacts $e$ and is connected by conductors $f$ and $f'$ to the contacts of the controller C C' so that it will always be in series with the motor circuit irrespective of the adjustment of the controller for one or another speed of the motor.

The control switch E may be of any suitable construction and located in a convenient position, but its movable arm $e^2$ is preferably connected to a foot lever G, located within reach of the driver's foot. The switch arm may be connected to the foot lever by rods $g$ and $g'$ and an intervening rock arm $g^2$, or by any other suitable connections. A spring H connected to any suitable part of the connections normally holds the foot lever in the retracted or rearward position and the switch arm $e^2$ in the position shown, in which all of the resistance $e'$ is cut out of the motor circuit, as indicated in Fig. 2.

In starting the vehicle and in changing from one speed to the next, the foot lever is first shoved forward so as to move the switch arm $e^2$ to the position indicated by broken lines in Fig. 2, in which the motor circuit is opened, and the foot lever is then allowed to slowly return to the normal position, thereby gradually cutting out the resistance. The motor circuit can be opened at any time for shutting off the current without regard to the controller C C' by simply shoving the foot lever forwardly to throw the controller switch to the open circuit position. The foot lever is connected to the vehicle brakes, one of which is indicated at I in Fig. 1, by any suitable connections whereby a further forward movement of the lever after the motor circuit has been opened will set the brakes. As shown, the rock arm $g^2$, to which the foot lever is connected, is connected by a slotted link $k$ to one arm of a rock shaft $k'$ which has another arm connected by a link $k^2$ to the brake. The slotted link $k$ provides a lost motion connection between the foot lever and the brake, which allows the described operation of the foot lever to shut off the power without operating the brake. When it is desired to stop the vehicle the foot lever is shoved forwardly to its limit which first moves the arm $e^2$ of the control switch to increase the resistance in the motor circuit and finally open the circuit, and then sets the brakes.

The described controlling mechanism enables the operator to control the speed of the vehicle and shut off the power and apply the brakes by a simple movement of the one foot lever and without any manipulation of the speed controller, thus leaving his hands free to steer the vehicle or to operate his signals. This is a great advantage, especially in the event of an emergency when it is necessary to stop the vehicle quickly, as the operator has only one thing to do, that is, to shove the foot lever, and the danger of accident by reason of the operator becoming confused is greatly lessened. Another advantage is that, owing to the action of the return spring H for the foot lever, the lever normally takes a position at which all of the resistance of the control switch is out of the circuit, which will tend to the most economical operation of the car, since no power will be wasted in the resistance. As some effort is required to keep the foot lever down, the tendency of the operator will be to adjust his speed by means of the controller rather than by means of the foot lever, which will result in a saving of power. The controlling mechanism also enables the operator to readily reduce and increase the speed of the vehicle by the operation of the single foot lever. This is important in driving the vehicle in crowded thoroughfares, where it is frequently necessary to repeatedly reduce the speed for short distances and then quickly increase the same to avoid collision or interference with other vehicles. These sudden changes in speed can all be easily effected by the operation of the foot lever and the simplicity of this operation is such that no special skill or experience is required in driving the vehicle.

I claim as my invention:

In a controlling mechanism for electrical vehicles, the combination with an electric motor having a field winding consisting of a plurality of coils, a battery consisting of a plurality of cells, and electrical connections, of a hand-operated controller which is adjustable to different positions for connecting the field coils and cells in different groups for varying the rate of speed of the motor, a control switch and connections for varying the resistance in the motor circuit and opening the motor circuit irrespective of the adjustment of said controller, a brake, a foot lever for actuating said control switch and applying the brake, and a lost motion connection between said foot lever and said brake, whereby the foot lever can be used for controlling the speed of the vehicle, without applying said brake, substantially as set forth.

Witness my hand, this 8th day of October, 1909.

FREDERICK G. PECK.

Witnesses:
 EDWARD C. HARD,
 ADELINE L. McGEE.